INVENTORS
GERRIT G. DeHAAS
LESLIE H. CLARK
CHARLES J. LANG
ATTORNEYS

United States Patent Office

3,654,353
Patented Apr. 4, 1972

3,654,353
METHOD OF TREATING SPENT PULP LIQUORS
Gerrit G. de Haas, Longview, Leslie H. Clark, Kelso, and Charles J. Lang, Longview, Wash., assignors to Weyerhaeuser Company, Tacoma, Wash.
Filed Oct. 23, 1964, Ser. No. 406,087
Int. Cl. C07c 53/10
U.S. Cl. 260—527 R          5 Claims

ABSTRACT OF THE DISCLOSURE

A method of recovering volatile, condensible organic acids, particularly acetic acid, present in the vapor stream obtained during evaporation of spent pulping liquor by injecting into the vapor stream a finely divided basic material, such as sodium hydroxide, to convert the acids in the vapor stream to their non-volatile salts. The salts are subsequently separated from the residual vapor stream, primarily water vapor, by entrainment.

---

This invention relates to a method of recovering volatile acids from steam or other vapors containing acids vaporized during the concentration of spent pulp liquors in evaporators prior to burning in a recovery furnace. Spent pulp liquors, obtained as a by-product of pulp production, is an aqueous solution containing substantial quantities of dissolved wood components and process chemicals used in the pulping operation. Because of the large quantity of valuable process chemicals remaining in the spent sulfite pulp liquors, much attention has been given to the development of economical methods for the recovery and reuse of these process chemicals from the spent liquors. One of these methods includes burning the spent sulfite pulping liquors to recover the pulping chemicals while utilizing the heat value of the organic material present therein. However, since spent pulping liquors contain nonvolatile solids in a concentration usually ranging from about 8 to 15%, it is necessary that these liquors be evaporated and concentrated prior to burning in a recovery furnace. Another important reason for developing methods to recover processed chemicals from these spent pulp liquors, is the ever-increasing demand for the prevention of pollution of our streams and rivers caused by the dumping of these waste chemicals.

In the evaporation of spent pulp liquors, for reasons of steam economy and heat balance throughout an operating plant, it is usual to use a multiple effect evaporator or a thermal compression evaporator. This may be composed of several units or effects connected in series by vapor piping, in which the water vapor boiled off the liquor in one effect acts as heating steam in the steam chest of the following effect. Despite the efficiency of these recovery systems, nevertheless, significant residual pollution is caused by volatile chemicals that are vaporized during the evaporation of the spent liquors and are subsequently formed part of the condensate which is eventually disposed of by dumping into rivers or streams.

It is therefore an object of the present invention to provide a process for the recovery of these volatile chemicals, in a concentrated form, from the vapors during evaporation of spent liquors. Another object of the present invention is to provide a process for removing valuable processed chemicals from the vapor stream in a multieffect evaporator operation without significantly affecting the efficiency of the evaporators. It is a further object of the present invention to provide a method for the recovery of substantial quantities of volatile chemical compounds present in the vapor stream and of the evaporator system and thereby providing a condensate from the vapor stream having a much lower biological oxygen demand from the receiving river or stream.

It is a particular object of the present invention to recover valuable organic acids, in particular, acetic acid and formic acid, present as volatiles in the vapor stream in the evaporator system.

The present invention has discovered that the volatile acids are vaporized during evaporation of the spent sulfite liquors and are contained in the vapors passing from one effect to the next. It has been further discovered that these volatile compounds can be reacted, while still in the vapor phase, with other chemical compounds to provide a compound that is not volatile. It has been further discovered that these nonvolatile compounds can be separated from the vapor stream using low resistant separators which do not significantly affect the efficiency of the evaporator system and permits the water vapor to continue to flow to the heat exchanger of the next effect.

In its broad application, the present invention relates to a method of injecting a reactive compound into the vapor stream that will react with the volatile materials contained therein to form new nonvolatile compounds in the form of crystalline products or solutions of the two compounds. The invention further relates to a method of forming these reacted nonvolatile compounds with little or no condensation of the large amounts of water vapor present in the vapor stream, to thereby provide for the separation of a concentrated reacted product. It should be understood that a great variety of reactive compounds can be injected to react with the great variety of volatile organic compounds either separately or simultaneously to complete the conversion to nonvolatile compounds and that the injected compounds can be in a variety of forms, such as a solution, powder, gas or in a molten condition.

For the purposes more clearly describing and illustrating the present invention, the method of the present invention relating to the recovery of organic acids from spent sulfite liquor will be described in detail. Particularly, the method will be described as it relates to the recovery of acetic, formic and sulfurous acids which are present in the vapor stream as volatile acids as a result of the evaporation of the spent sulfite pulping liquor from the level of about 10% to 50% total solids.

Figure 1:
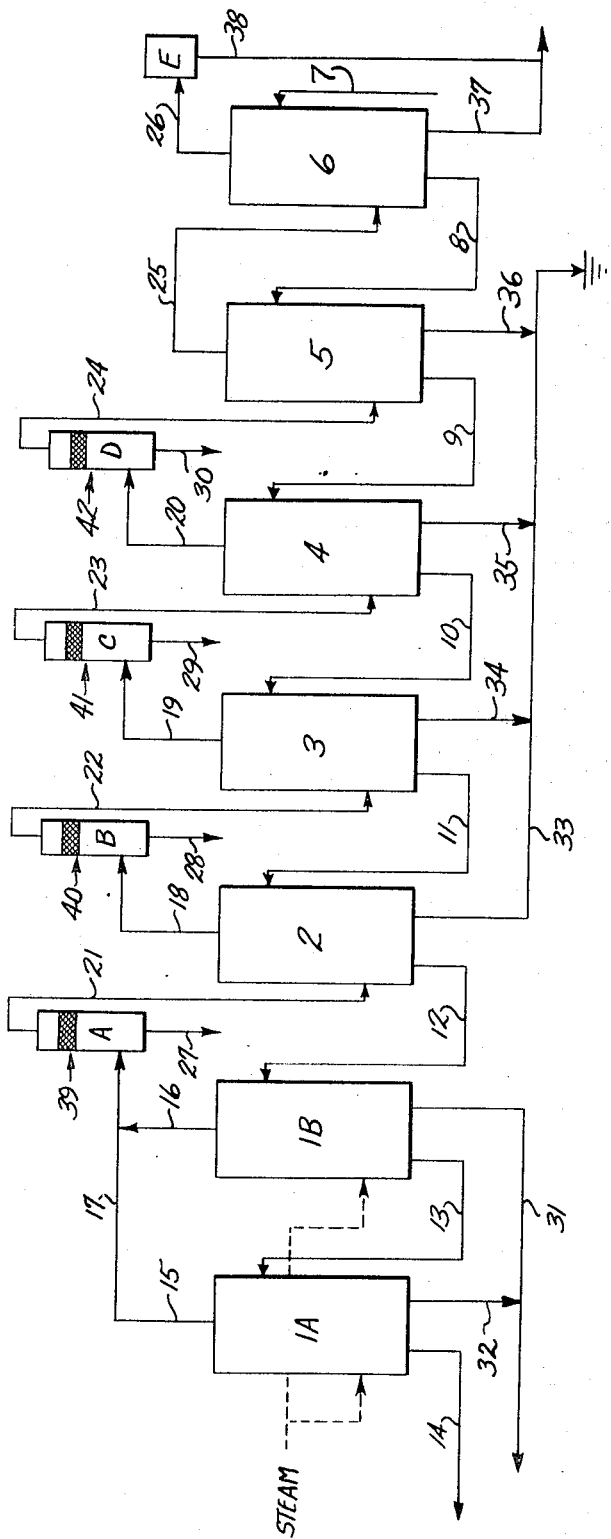
FIG. 1 is a schematic diagram of a multievaporator operation for the concentration of spent pulp liquor.

Referring to FIG. 1, a six-stage multieffect evaporator system is illustrated in schematic form, with the various effects being numbered from 1A through 6. The spent liquor, after separation from the pulp, is shown entering through line 7 into the effect 6 of the evaporator system, and then in a countercurrent fashion, flows through lines 8, 9, 10, 11, 12, and 13 through each separate effect. Steam enters into effects 1A and 1B and the steam condensate is returned to the powerhouse through lines 31 and 32. The vapors from effects 1A and 1B flow through lines 15, 16, and 17 into reaction chamber A, and then through line 21 into effect 2. Likewise the vapors from effects 2, 3, 4, flow through lines 18, 19, and 20, respectively, into reaction chambers B, C, and D, and thence through lines 22, 23, and 24 to the following effect. The vapors from effect 5 flow through line 25 directly into the effect 6. The vapors from effect 6 flow through line 26 into a condenser E. Condensate from effects 2, 3, 4 and 5 flows through lines 33, 34, 35 and 36, respectively, and are discarded. The condensate from effects 6 and condenser E flows through lines 37 and 38, respectively, and are returned to the acid plant. The condensed evaporated spent liquor leaves effect A through lines 14 and is conveyed to the recovery furnace. Separators in the reaction chambers are designated by numbers 39, 40, 41 and 42, whereas the liquid product resulting from the reaction is romoved through lines 27, 28, 29 and 30, respectively.

Figure 2:
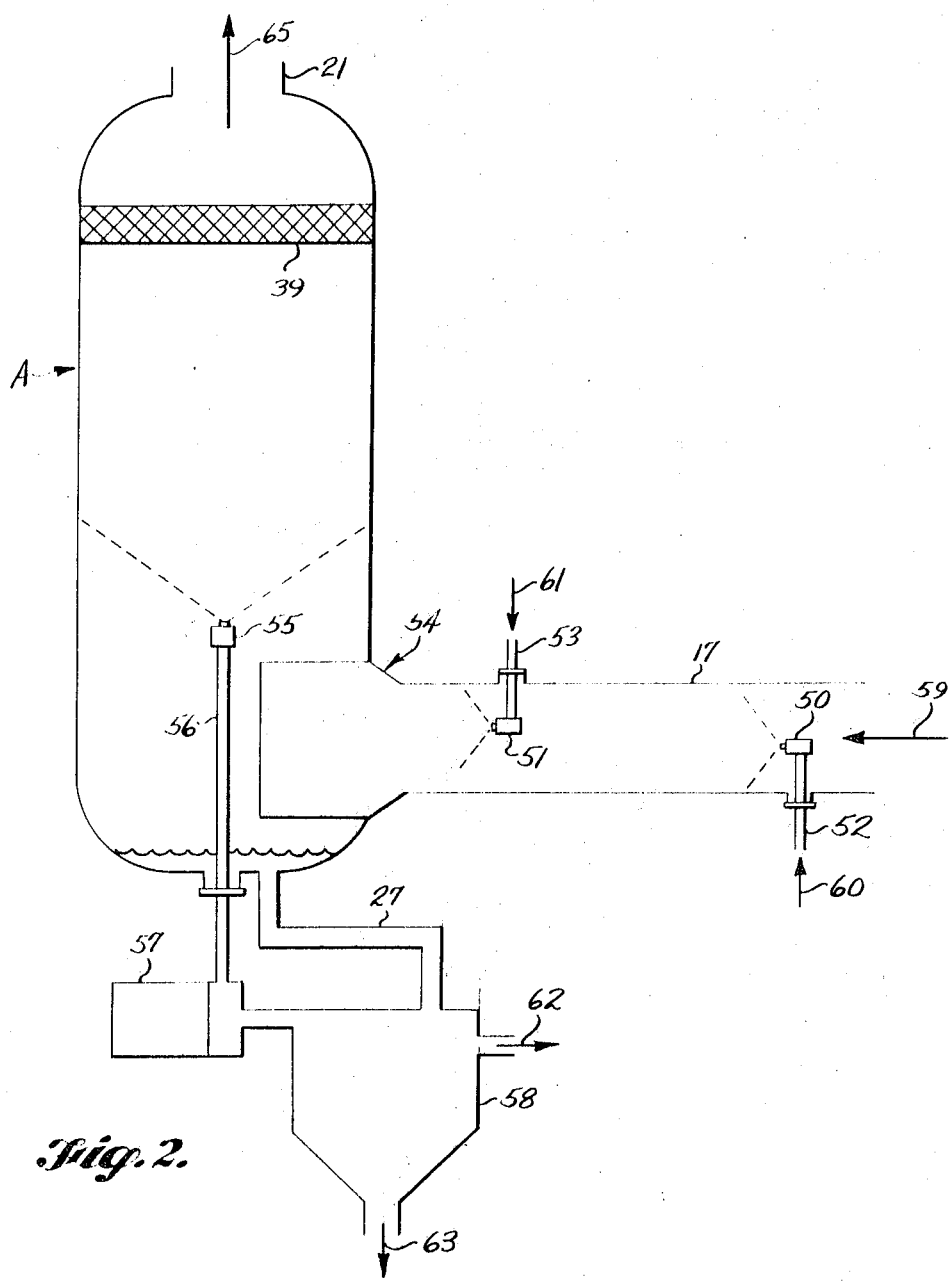
FIG. 2 is a schematic illustration of the reaction chamber of the present invention.

FIG. 2 illustrates one form of the reaction chamber for practicing the process of the present invention. The reaction chamber A, with exception of size, is identical with reaction chambers B, C and D, and accordingly, a description of this reaction chamber will apply equally to the respective reaction chambers.

Accordingly, the vapors from evaporator effects 1A and 1B are fed into reaction chamber A through line 17. Line 17 is provided with a pair of spaced apart nozzles 50 and 51 which are connected to a source of reactive compounds by pipes 52 and 53. The line 17 is connected to a lower portion of reaction chamber A in such a manner so that the vapors coming from the effects 1A and 1B will enter the reaction chamber A tangentially as at 54.

The upper end of the reaction chamber A is provided with a separator 39 preferably in the form of a mesh pad formed of "Teflon." This type of pad is desirable to minimize scaling tendencies due to spent liquor entrainment in the vapors.

The reaction products from the vapor acetic acid, formic acid, and sulfurous acid and the introduced reactive compounds fall to the bottom of the reaction chamber A and are collected in a settling tank 58 through pipe 27. The reaction products when sodium hydroxide is used are sodium acetate, sodium sulfite, and sodium formate. Due to the basic pH maintained in the product liquor, most of the sodium sulfite precipitates out. The sodium acetate and sodium formate will be in aqueous form and will be brought off at the top of settling tank 58 while the sodium sulfite crystals will be removed at the bottom thereof.

In order to insure efficiency of operation and use of all the reactive basic compounds, a recirculating pump 57 is connected to the top of the settling tank 58 and pumps the reactive compounds up into reactive chamber A through pipe 56 that is injected into the reaction chamber by a nozzle 55.

In operation, the vapor enters the reaction chamber A in a direction as indicated by arrow 59 through pipe 17. The basic reactive compounds are injected into pipe 17 as indicated by the arrows 60 and 61 to react therewith. The basic reactive compound will react with the acetic acid, formic acid, and sulfur dioxide to form the reaction products that fall to the bottom of reaction chamber A. The reaction products are removed from the settling tank as indicated by arrows 62 and 63, and the water vapors and other materials in the vapor pass through the separator 39 and out through line 21 to the next effect as indicated by arrow 65.

EXAMPLE

Using a system as illustrated in FIGS. 1 and 2 and a spent sulfite pulp liquor having a pH of 3.0 and a solids concentration of 12% and containing by analysis 72 lbs. of acetic acid per air-dried ton of pulp was evaporated and concentrated to a spent pulp liquor containing 52% solids. An analysis of the steam vapor passing from effects 1A and 1B into reaction chamber A showed it to contain 0.5% by weight acetic acid and 0.2% by weight sulfur dioxide. The conditions of operation were 25 p.s.i.g. and 270° F. with a vapor flow rate of 2,800 cu. ft./min. As illustrated in FIG. 2, the 18 inch in diameter line entered the 4' in diameter reaction chamber tangentially, with the vapor velocity decreasing from an initial 1600 feet per minute down to 225 ft. per minute.

Using the reaction chamber as illustrated in FIG. 2 with a recirculated flow ratio of about 10–15 times the fresh caustic flow, the following runs illustrate the operation of the method of the present invention.

TABLE I

| Run number | Caustic flow, 50% NaOH | | Inlet vapor | | Outlet vapor | | Product | | | Recovery | |
|---|---|---|---|---|---|---|---|---|---|---|---|
| | G.p.m. | E/min. | $SO_2$, E/min. | HAc, E/min. | $SO_2$, E/min. | HAc, E/min. | $Na_2SO_3$, E/min. | NaOAc, E/min. | NaOH, E/min. | HAc, Percent | $SO_2$, Percent |
| 1 | 0.43 | 29.6 | 15.3 | 6.4 | 0.2 | 1.2 | 15.1 | 5.2 | 9.3 | 81 | 99 |
| 2 | 0.28 | 19.3 | 13.7 | 5.1 | 1.2 | 1.4 | 12.5 | 3.7 | 3.1 | 73 | 91 |
| 3 | 0.16 | 11.3 | 11.6 | 4.7 | 2.6 | 2.5 | 9.0 | 2.2 | 0.1 | 47 | 77 |

Thus the present method provides for the recovery of substantial quantities of useful and valuable chemical compounds from spent pulping liquors which heretofore because of their low concentration in the spent liquors it has generally been considered uneconomical to recover them. Furthermore, the present invention provides a method of recovering the chemicals from the vapor stream during the evaporator operation of the recovering system without affecting the efficiency of the evaporator system. Since practically no water vapor is condensed from the vapor stream passing from one evaporator effect to another, the reaction products of the organic acids are recovered as salts in solution of highly concentrated form suitable for subsequent conversion to acids.

While the present invention has been described in particular as relating to the recovery of acetic acid, formic acid, and sulfur dioxide vapors by converting while in the vapor form to sodium acetate, sodium formate, and sodium sulfite and recovering as a crystalline product or solution in concentrated form, it is obvious that the process is not limited to organic acids or sulfur dioxide. Other reactive compounds can be introduced to the vapor stream to react with a variety of volatile organic compounds either separately or simultaneously to complete the conversion to nonvolatile compounds. Examples of other compounds that are useful in the recovery of acetic acid are sodium carbonate, magnesium hydroxide, calcium hydroxide, and ammonium hydroxide. It is also obvious that the reactive compounds may be introduced into the vapor stream in a variety of forms such as solutions, powders, gases, or as molten compounds.

Because the composition of spent pulping liquors will vary from plant to plant and also there are variations in the various recovery systems used in different plants, it is contemplated that the operating variables will in necessity have to be adjusted with respect to caustic reaction and collection efficiency with particular attention being paid to the effect of vapor velocity, and vapor rate, the effect of entrainment load, the effect of nozzle arrangements and type of nozzle, the effect of nozzle distance on the separator, and the type of separator used in the reaction chamber. Various types of separators that have been found useful in the practice of the present invention are the simple gravity settlers, centrifugal collectors, electrical precipitators, impingement separators and knitted mesh separators.

It is an advantage to establish the highes rate of reaction since the low rate of reaction has to be compensated by more reacting time in order to achieve the desired degree of conversion. It is found that an increase in the surface areas of the particles of the reactive compound introduced to the vapor stream improves the rate of reaction considerably. This can be accomplished in the case of a spray-type arrangement, by increasing the flow of the reactive compound, involving recirculation and by reducing the mean mass diameter of the particles distributed into the vapor. It was observed that pneumatic and sonic nozzles introduced a smaller particle size reactive compound into the vapor stream than standard type nozzles.

Another variation which may be practiced when it is desirable to produce an end product having a low pH, is that of placing the distributor nozzles in series. The solution containing the reactive compound is passed from one distributor to the next in countercurrent fashion to the vapor stream. Another variation to achieve a high degree of utilization of the caustic used is to operate, for example, five effects of the multieffect evaporators with a slight excess of caustic and use the products containing the free caustic of the five effects to operate the sixth effect. The sixth effect delivers a final product having a lower pH with only slightly higher losses of acids in the vapor stream.

As illustrated in FIG. 2, it is desirable to have the vapor stream and the reactive compounds enter the reaction chamber tangentially as the spin created tends to move the particles of the reactive compounds from the center out to the wall leaving fewer particles to be removed by the separator.

In the case of sulfite spent liquor, it is often advantageous to steam strip a major part of the sulfur dioxide from the liquor before the evaporation. This will minimize the quantity of sulfite crystals formed during the reaction. The partial pressure of sulfur dioxide in organic acids above the spent liquor can be increased by acidification with, for example, sulfuric acid. In some cases, it has been advantageous to start with a high pH liquor of about 6 which will then have a negligible volatile acid loss and then acidify after the evaporation has been partly completed. In this manner, the recovery of the volatile acids can be achieved in a fewer number of effects than in the case that is illustrated in FIG. 1.

Having now described and illustrated the practice of the present invention, we claim:

1. Method of recovering volatile, condensible organic acids as their non-volatile salts, the acids being present in the vapor stream obtained from the evaporation of spent pulping liquor in a multi-effect evaporator which comprises, (1) introducing the vapor stream containing the acids into a reaction zone, (2) introducing into the reaction zone containing the vapor stream sodium hydroxide to convert the acids to their respective non-volatile salts, and (3) separating the non-volatile salts from the vapor stream.

2. Method of recovering in concentrated form acetic acid in the form of its acetate salt, the acetic acid being present in a relatively minor amount in the vapor stream obtained from the evaporation of waste sulfite pulping liquor in a multi-effect evaporator comprising, (1) introducing the vapor stream containing acetic acid into a reaction zone, (2) introducing into the reaction zone containing the vapor stream finely divided sodium hydroxide at the temperature of the vapor stream to convert the acetic acid contained in the vapor stream to sodium acetate with substantially no condensation of the water vapor present in the vapor stream, and (g) separating the sodium acetate and excess sodium hydroxide from the vapor stream by entrainment.

3. Method according to claim 2 wherein a portion of the components separated from the vapor stream containing sodium acetate and excess sodium hydroxide is re-injected into the reaction zone.

4. Method according to claim 2 wherein, prior to evaporation thereof, the waste sulfite pulping liquor stream is steam stripped to remove at least a portion of the sulfur dioxide contained therein.

5. Method according to claim 2 wherein the sodium hydroxide is injected into the reaction zone tangentially so as to move the particles of sodium acetate from the center of the reactor to the wall of the reactor whereby fewer particles are left to be removed by separation from the vapor stream thereof.

References Cited

UNITED STATES PATENTS

| | | | |
|---|---|---|---|
| 2,782,215 | 2/1957 | Smith et al. | 260—541 |
| 2,895,990 | 7/1959 | Larrison et al. | 260—541 |
| 1,605,925 | 11/1926 | Drewsen | 23—131 |
| 2,385,955 | 10/1945 | Tomlinson | 23—131 |
| 2,913,309 | 11/1959 | Sandborn et al. | 23—129 |
| 3,273,961 | 9/1966 | Rogers et al. | 23—131 |

JAMES A. PATTEN, Primary Examiner

U.S. Cl. X.R.

23—129, 131; 260—541, 542